United States Patent
Reed et al.

(10) Patent No.: US 6,266,704 B1
(45) Date of Patent: Jul. 24, 2001

(54) ONION ROUTING NETWORK FOR SECURELY MOVING DATA THROUGH COMMUNICATION NETWORKS

(75) Inventors: Michael G. Reed, Bethesda; Paul F. Syverson; David M. Goldschlag, both of Silver Spring, all of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/086,541

(22) Filed: May 29, 1998

Related U.S. Application Data

(60) Provisional application No. 60/048,338, filed on May 30, 1997.

(51) Int. Cl.[7] .............................. G06F 15/173; G06F 1/24
(52) U.S. Cl. ...................... 709/238; 709/243; 713/153; 713/160; 713/201
(58) Field of Search ................................... 709/243, 238, 709/242; 713/153, 161, 201, 160

(56) References Cited

U.S. PATENT DOCUMENTS

| | | | |
|---|---|---|---|
| 4,924,513 | * 5/1990 | Herbison et al. | 380/21 |
| 5,353,283 | * 10/1994 | Tsuchiya | 370/392 |
| 5,444,782 | * 8/1995 | Adams, Jr. et al. | 713/153 |
| 5,455,865 | * 10/1995 | Perlman | 713/153 |
| 5,473,603 | * 12/1995 | Iwata | 370/60 |
| 5,588,060 | * 12/1996 | Aziz | 380/30 |
| 5,740,374 | * 4/1998 | Raffali-Schreinemachers | 709/238 |

(List continued on next page.)

OTHER PUBLICATIONS

Anderson (Ed.); Information Hiding; Springer, New York, NY; First International Workshop, Cambridge, U.K., May/Jun. 1996; pp. 137–150.

Goldschlag et al.; Hiding Routing Information; An Issue Newton Institute Workshop, Univ. of Cambridge; May 30–Jun. 1, 1996.

Goldschlag et al.; Privacy on the Internet; INET '97 Kuala Lumpur Jun. 24–27, 1997.

Reed et al.; Proxies for Anonymous Routing; 12th Annual Computer Security Applications Conference, San Diego, CA; Dec. 9–18; 1996; pp. 95–104.

Syverson et al.; Anonymous Connections and Onion Routing; IEEY Symposium on Security and Privacy 1997; pp. 1–11.

—; The Internet Protocol; —publ. Unk.— pp. 27–29 & 40–41.

Christian–Huitema, Routing in the Internet, Prentice Hall, 1995. pp. 27–29, 40–41, 1995.*

Pfitzmann A. et al., "ISDN–Mixes: Untraceable Communication with Very Small Bandwidth Overhead"; Proc. GI/ITG–Conference; Feb. 20–22, 1991.*

(List continued on next page.)

*Primary Examiner*—Glenton B. Burgess
*Assistant Examiner*—Bradley Edelman
(74) *Attorney, Agent, or Firm*—John J. Karasek; Charles J. Stockstill

(57) ABSTRACT

The onion routing network is used to protect Internet initiators and responders against both eavesdropping and traffic analysis from other users of the Internet. In the onion routing of the invention, instead of making connections directly to a responding machine, users make connections through onion routers. The onion routing network allows the connection between the initiator and responder to remain anonymous. Anonymous connections hide who is connected to whom and for what purpose from outside eavesdroppers.

22 Claims, 1 Drawing Sheet

U.S. PATENT DOCUMENTS

| | | | | |
|---|---|---|---|---|
| 5,751,813 | * | 5/1998 | Dorenbos | 713/153 |
| 5,809,025 | * | 9/1998 | Timbs | 370/400 |
| 5,845,091 | * | 12/1998 | Dunne et al. | 709/240 |
| 5,928,332 | * | 7/1999 | Pierce | 709/242 |

OTHER PUBLICATIONS

Chaum, "Untraceable Electronic Mail, Return Addresses, and Digital Pseudonyms", Communications of the ACM, vol. 24, No. 2, Feb. 1981. pp. 84–88.*

HTTP://cypherpunks.venona.com/date/1992/12/msg00107.html, "Chaum's 'The Dining Cryptographers Problem' (Very Long", pp. 1–11, Nov. 2000.*

Goldschlag et al., "Hiding Routing Information", Naval Research Laboratory, Apr. 30, 1996, pp. 125–142.*

Pfitzmann, B. et al., "How to Break the Direct RSA–Implementation of Mixes", Institut fur Rechnerentwurf und Fehlertoleranz, Universitat Karlsrhue, Postfach 6980, D–7500 Karlsruhe 1, F.R. Germany, 1990.*

Pfitzmann, A. et al., "Networks Without User Observability", Apr. 2, 1986, http://www.semper.org/sirene/publ/Pfwa_86anonyNetze.html, pp. 1–8, Nov. 2000.*

Gulcu et al., "Mixing Email with Babel", IBM Research Division, Zurich Research Laboratory, from IEEE 1996, pp. 1–15.*

* cited by examiner

ONION ROUTING NETWORK FOR SECURELY MOVING DATA THROUGH COMMUNICATION NETWORKS

CROSS-REFERENCE TO RELATED APPLICATIONS

This application has the priority of Provisional Application Ser. No. 60/048,338, and filed May 30, 1997.

BACKGROUND OF THE INVENTION

1.0 Field of the Invention

The present invention relates to the field of moving user real-time data within a communication network and, more particularly, to a system which moves data within a communication network, such as the Internet, without revealing the identity of the initiator of the data, nor the identity of the receiver of the data, nor the content of the data.

2.0 Description of the Prior Art

The present invention is concerned with the right to privacy involved in electronic communication which may be better described by first discussing other forms of more commonly known communications.

For example, letters sent through the Post Office are usually in an envelope marked with the sender's and recipient's addresses. The general public trusts that the Post Office does not peek inside the envelope, because the contents are private. The general public also trusts that the Post Office does not monitor who sends mail to whom, because that information is also considered private.

These two types of sensitive information, the contents of an envelope and its addresses, apply equally well to electronic communication over the Internet. As the Internet becomes an increasing important part of modern day communication and electronic commerce, protecting the privacy of electronic messages also becomes increasingly important. Just like mail, electronic messages travel in envelopes, that is, electronic envelopes. Protecting the privacy of electronic messages requires both safeguarding the contents of their envelopes and hiding the addresses on their envelopes. Although communicating parties usually identify themselves to one another, there is no reason that the use of a public network, such as the Internet, ought to reveal to others who is talking to whom and what they are talking about. The first concern is traffic analysis, the latter is eavesdropping.

By making both eavesdropping and traffic analysis hard, the privacy of communication is protected. However, anonymity need not be completely maintained because two parties communicating with each other may need to identify each other. For example, if a Web surfer wants to buy something using the electronic equivalent of cash, the purchaser may need to be identified to properly establish the debt being incurred; however, the network need not know any of this information.

If an electronic envelope keeps its contents private, and the address on the envelope is also hidden, then any identifying information can only be inside the envelope. So for anonymous communication, we also should remove identifying information from the contents of an envelope. This may be called anonymizing a private envelope.

An anonymous connection is a communications channel for which it is infeasible to determine both endpoints, that is, which principal initiated the communication and whom receives the communication. The principal initiating the connection is the initiator, and the principal to whom the initiator connects is the responder. The present invention implements a mechanism for anonymous connections that operates below the application layer and supports a variety of Internet applications, wherein the application layer is the highest layer within the hierarchy of the protocols being used to perform the data transfer.

The usage of anonymous communication is known and generally referred to by the use of various terms in the art. For example, anonymous "Mixes" were introduced in 1985 as a store and forward mechanism for anonymously moving data through a network. These Mixes are not suitable for bidirectional real-time communication which is of importance to the present invention.

Anonymous remailers, also known in the art, have been used to store and forward mail from a sender to a recipient without revealing the identity of the sender to observers of the network. Different versions of these remailers use Mixes in a highly application specific way which limits their applicability for other uses.

Anonymous bidirectional real-time communication for Integrated Service Digital Network (ISDN) has also been explored, especially as in related phone switching means. Mixes are incorporated into an ISDN phone switch to permit anonymous connections between callers within the same ISDN switch. The usage of these anonymous connection means is dependent upon the characteristics of the ISDN phone switches which, in turn, has inherent limitations which, in turn, limit their usage.

The first mention of near real-time Mixes for the Internet appears in the Pipe-Net techniques also known in the art. Pipe-Net's design provides fixed bandwidth, low-capacity communications channels strongly protected against both active and passive traffic analysis attacks. However, the fixed bandwidth and low-capacity communication limit their usage. Further, to our knowledge this Pipe-Net's design has never been built, fully described, nor formally published.

The anonymizer, known in the art, provides weak protection against traffic analysis of World Wide Web (WEB) communications, by providing a centralized service that removes identifying information from the data stream. So called "Crowds" extends this approach to decentralize the proxy. However, the Anonymizer does not protect against passive attacks at the centralized proxy; whereas Crowds does not protect against global passive attacks. It is desired to provide a general purpose system that allows anonymous connections to move data through a communication network and that does not suffer the drawbacks of the prior art.

OBJECTS OF THE INVENTION

It is a primary object of the present invention to provide a system for electronic communications that protect the identity of the initiator and the intended receiver of the data, as well as the content of the data, from traffic analysis and eavesdropping. The system has variable bandwidth, high capacity, near real-time, bidirectional, and application independent communication characteristics.

It is another object of the present invention to provide a subcomponent for the system that separates anonymity of the connection from anonymity of the data passing over the connection.

It is still another object of the present invention to provide a distributed routing network, comprised of systems of the present invention, that can be configured in many ways to shift trust between network elements, thereby shifting the responsibility for the protection of private information to the cognizant parties. For example, a large company may install a system of the present invention on the firewall separating its protected site from the open Internet and, therefore, take the responsibility to protect its own information. This system, once instituted, would be integrated into the distribution routing network.

Further still, it is an object of the present invention to provide a system that operates below the application layer. The system of the present invention supports many unmodified applications by means of proxies. The system of the present invention includes proxies that may be used for Web browsing, remote login, electronic mail and raw data connections.

SUMMARY OF THE INVENTION

The present invention is directed to a method for establishing and utilizing a virtual circuit for moving data for electronic communication within a communication network that provides application independent, real-time, and bi-directional anonymous connections throughout the communication network that are resistant to both eavesdropping and traffic analysis.

The present invention provides a virtual circuit that is a pathway between two devices, one defined as an initiator and the other defined as a responder, communicating with each other in a packet switching system, such as the Internet. The virtual circuit comprising a plurality of onion routers arranged adjacent to each other and where adjacent onion routers maintain longstanding connections to each other and where each onion router has a protocol to provide communications therebetween.

Each of the onion routers is responsive to an onion, having a layered data structure, with one layer per each of the onion routers in the pathway. Each layer of the onion comprises an encryption of the identity of the next onion router in the pathway and encryption material. In operation, the initiator makes a request to a proxy to establish the virtual circuit through the onion routers. In one embodiment, the proxy connects to a second proxy which then defines the pathway, and in another embodiment, the first proxy defines the pathway itself with the pathway consisting of individual paths between adjacent onion routers.

BRIEF DESCRIPTION OF THE DRAWINGS

These and other objects, features and advantages of the invention, as well as the invention itself, become better understood by reference to the following detailed description when considered in conjunction with the accompanying drawings wherein like reference numbers designate identical or corresponding parts throughout and wherein.

DETAILED DESCRIPTION OF THE PREFERRED EMBODIMENTS

Figure 1:
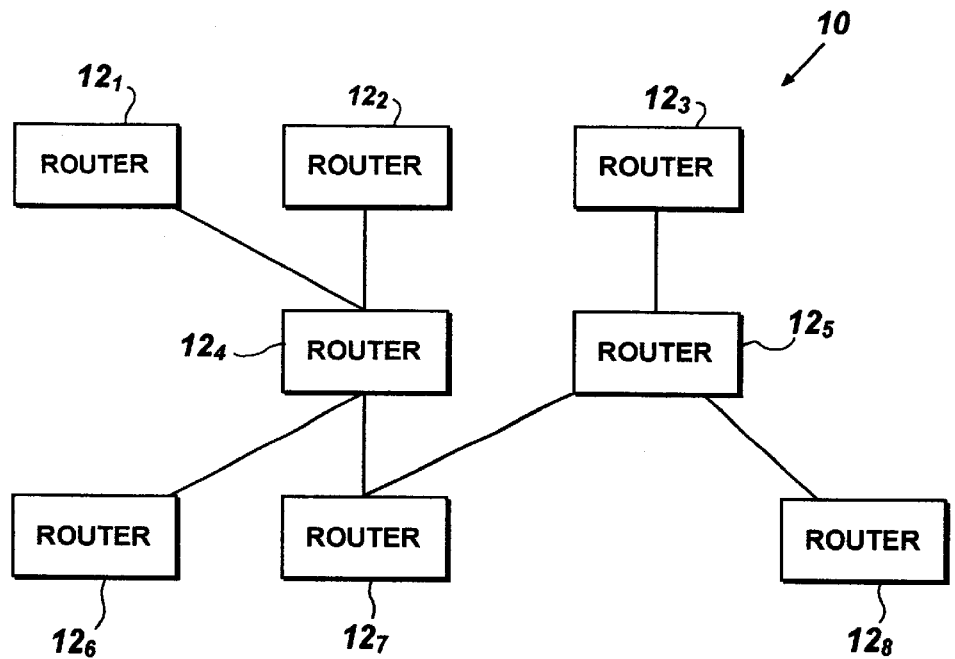
FIG. 1 is a representation of a communication network.

Referring to the drawings, there is shown in FIG. 1 a packet switched network 10 interconnecting a plurality of users (routers) $12_1$, $12_2$, $12_3$ ... $12_N$. In a packet switched network, such as the Internet, packets have a header used for routing, and a payload that carries the data. The header, without the benefits of the present invention, is visible to the network (and to observers of the network) and reveals the source and destination of the packet. Even if the header were obscured in some way, the packet, in particular the payload, could still be tracked as it moves through the network. Encrypting the payload is similarly ineffective, because the goal of traffic analysis is to identify who is talking to whom and not (to identify directly) the content of that conversation. The present invention eliminates these drawbacks and some of the various aspects of the present invention are disclosed in our six (6) technical articles given as follows: (1) "Hiding Routing Information" in preproceedings and presented at Workshop on Information Hiding, Cambridge UK, May 30–Jun. 1, 1996, published in proceedings by Springer-Verlay, December 1996; (2) "Proxies for Anonymous Routing" Proceedings of the 12th Annual Computer Security Applications Conference, San Diego, Calif., December 1996; (3) "Anonymous Connections and Onion Routing" Proceedings of the IEEE Symposium on Security and Privacy, Oakland, Calif., May 1997; (4) "Internet Communication Resistant to Traffic Analysis" of David M. Goldschlag, Michael G. Reed, and Paul F. Syverson, published in the 1997 NRL Review, Washington, D.C., April 1997: 109–111; (5) "Protocols using Anonymous Connections: Mobile Applications" of Michael G. Reed, Paul F. Syverson, and David M. Goldschlag, given at the 1997 Workshop on Security Protocols, Paris, France, April 1997; and (6) "Privacy on the Internet" of David M. Goldschlag, Michael G. Reed, and Paul F. Syverson, given at the INET '97, Kuala Lumpur, Malaysia, June 1997, all of which are herein incorporated by reference. More particularly, the present invention eliminates the drawbacks of the prior art by establishing and utilizing a virtual circuit in a packet switching network between two devices, to be further described hereinafter with reference to FIG. 2.

In general, the virtual circuit and the method of operation thereof both of the present invention create a pathway or transmission path between two devices or users, one defined as an initiator and the other defined as a responder, both communicating with each other in a packet switching system, such as the Internet. The virtual circuit comprises a plurality of herein referred to as "onion routers" that are arranged adjacent to each other where adjacent onion routers maintain longstanding connections to each other and each has a protocol to provide communications therebetween.

Each of the onion routers is responsive to a herein referred to "onion" having a layered data structure, with one layer per each of the onion routers in the pathway. Each layer of the onion comprises an encryption of the identity of the next onion router in the pathway and encryption material. In operation, the initiator makes a request to a proxy to establish the virtual circuit through the onion routers. In one embodiment, the proxy connects to a second proxy which then defines the pathway, and in another embodiment, the first proxy defines the pathway itself, with the pathway consisting of individual paths between adjacent onion routers.

In general, onion routing of the present invention protects against traffic analysis and eavesdropping attacks from both the network and observers. More particularly, onion routing works in the following way: the initiating application, instead of making a connection directly to a responding server, makes a connection to an appropriate onion routing proxy, to be further described, on its own machine or some remote machine. That onion routing proxy builds an anonymous connection through several other onion routers to the final destination, such as the responder. It is essential that each onion router only identify adjacent onion routers along the defined route. When the connection is broken, even this limited identification information about the connection is cleared at each onion router in a manner to be described. Data passed along the anonymous connections appear different at each onion router, so data cannot be tracked in route and undesirably compromised onion routers cannot cooperate. An onion routing network can exist in several configurations, as to be described, that permit efficient use by both large institutions and individuals.

The onion routing proxy of the present invention defines a pathway by sending an onion to the first onion router in the pathway. An onion router that receives an onion peels off its layer, that is, decodes and reads from that layer the name of the next hop in the defined route and the cryptographic information associated with its hop in the anonymous connection, pads the embedded onion to some constant size, and sends the padded, one-layer peeled onion to the next onion router as indicated in its layer of the onion. An onion router that receives an onion in which no next onion router is identified in the removed layer is the last onion router in the pathway.

In the operation of the routing network of the present invention, before sending data over an anonymous connection, the initiator's onion routing proxy, to be described with reference to FIG. 2, adds a layer of encryption for each onion router in the route. Conversely, as data moves through the anonymous connections, each onion router removes one layer of encryption. The last onion router awaits an identifier of the responder. This layering occurs in the reverse order for data moving from the responder back to the initiator. Data passed backward through the anonymous connections are repeatedly decrypted by the router proxy in order to obtain the plaintext that is directed to the initiator.

The onion router network is a packet switching network and wherein all data are packaged into fixed length cells and transferred between the initiator and the responder randomly mixed with other data cells from other virtual circuits.

Each onion router is a near real-time Mix, known in the art, that collects data arriving on many connections at roughly the same time, and forwards the collected data to their next hop in some random order. This forwarding includes data passing over established anonymous connections as well as onion data (data to establish new connections), connection-tear-down data, and other data passing between onion routers directly connected in the onion routing network.

The last onion router indicated within the innermost layer of the onion forwards data to a responder's proxy, whose job is to pass data between the onion network and the responding server. The virtual circuit 16 which is of particular importance to the present invention is the pathway within the packet switching network 10, such as the Internet, and may be further described with reference to FIG. 2.

Figure 2:
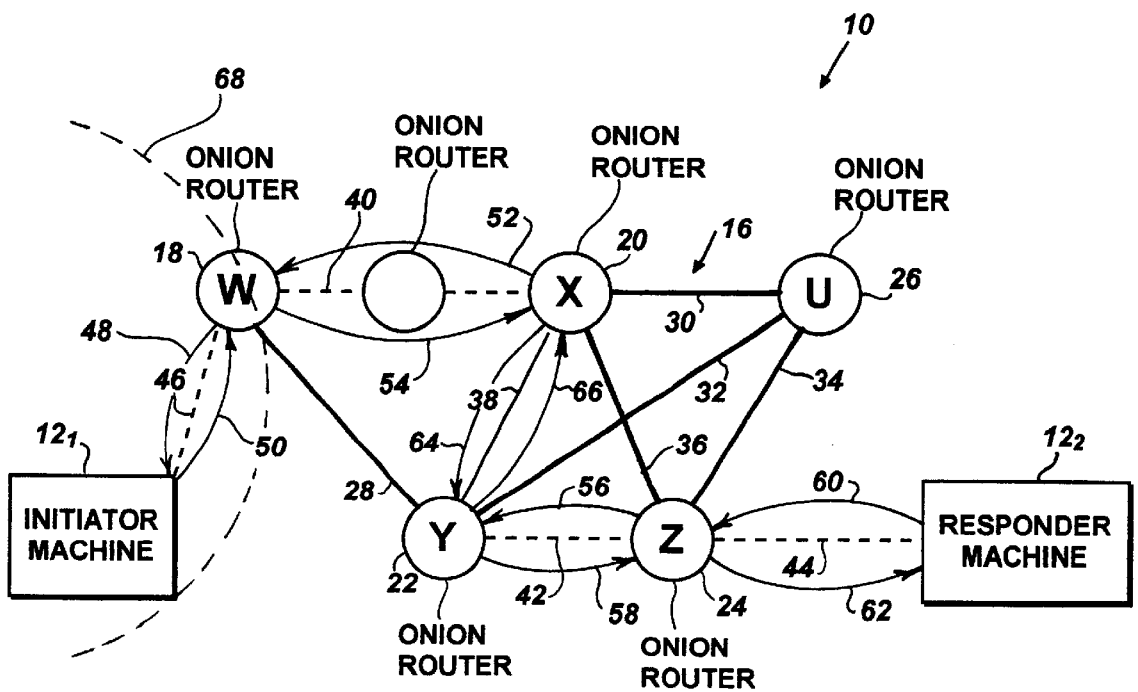
FIG. 2 is a diagram of a virtual circuit of the present invention.

FIG. 2 illustrates the virtual circuit 16 as being comprises of nodes 18, 20, 22, and 24 and also identified with the reference letters W, X, Y, and Z, respectively. The terms "nodes" and "routers" may be used interchangeably herein.

FIG. 2 further illustrates, by way of interconnecting lines between nodes as shown, link encrypted connections 28, 30, 32, 34, 36, 38, 40 and 42. Further, FIG. 2 illustrates, by way of an interconnecting line of onion proxy/onion router 18 and initiator $12_1$, an unsecured socket connection 46. Further, FIG. 2 illustrates a plurality of directional arrows 48, 50, 52, 54, 56, 58, 60, 62, 64 and 66, that indicated data flow between nodes along the virtual circuit 16. Furthermore, FIG. 2 illustrates, in phantom, a firewall 68 (known in the art) that separates a sensitive site, that includes the initiator machine $12_1$, from the external packet switched network 10, that is, the Internet. The initiator machine $12_1$ is assumed to be under the same administrative control as the onion proxy/onion router 18.

The basic configuration, shown in FIG. 2, has onion proxy/onion router 18 residing or sitting on the firewall 68 (known in the art) of a sensitive site. This onion proxy/onion router 18 serves as an interface means between machines, such as initiator machine $12_1$, behind the firewall 68 and the external network, such as Internet 10. Connections between machines behind the firewall 68 to the onion proxy/onion router 18 are typically protected by other means (e.g., physical security, known in the art). To advantageously complicate tracking of traffic originating or terminating within the sensitive site, the onion proxy/onion router 18 should also route data between other onion routers; i.e., routers 20 and 22.

The use of anonymous connections by two sensitive sites that both control onion routers effectively hides their communication from outsiders. However, if the responder is not in a sensitive site (e.g., the responder $12_2$ is some arbitrary WWW server) the data stream from the sensitive initiator should also be anonymized. Otherwise, even rudimentary analysis of the unprotected communication between the last onion router in the anonymous connection and the responder may undesirably reveal the initiator's identity.

For the embodiment shown in FIG. 2, onion routers in the network, such as the packet switching network 10 of FIG. 1, are connected by longstanding (permanent) socket connections, such as connections 28, 30, 32, 34, 36, 38, 40 and 42. Anonymous connections through the onion network are multiplexed over the longstanding connections. For any anonymous connection, the sequence of onion routers, in the designated route from the initiator machine $12_1$ to the responder machine $12_2$, is strictly defined at connection setup. However, each onion router can only identify the previous and next hops along a defined route.

A proxy is a program that provides a transparent service between two applications that would usually make a direct socket connection to each other but cannot. For example, a firewall 68 might prevent direct socket connections between internal and external machines. A proxy, such as the onion proxy/onion router 18 of FIG. 2, running on the firewall 68 may enable such connections.

There are two classes of proxies related to the present invention: one that bridges connections from initiating applications into the onion routing network (the application proxy), and another that completes the connection from the onion routing network to responders (the responder proxy).

Because the application proxy bridges between applications and the onion routing network, such as the virtual circuit 16 of FIG. 2, it should understand that the present invention takes into account both application protocols and onion routing protocols. Therefore, to simplify the design of application specific proxies of the present invention, it is preferred to partition the proxy, such as the proxy of onion proxy/onion router 18, into two components: the client proxy and the core proxy. The client proxy bridges between a socket connection, such as connection 46 of FIG. 2, from an application and the core proxy. It is the obligation of the client proxy to massage the data stream so both the core proxy and the responder proxy, such as responder proxy/onion router 24 of FIG. 2, can be application independent. Specifically, the client proxy should prepend to the data stream a standard structure that identifies the ultimate destination by either hostname/port or Internet Protocol (IP) (well known in the art) address/port. Additionally, the client proxy should process a one byte return code from the responder proxy, and either continue if no error is reported, or report the onion routing error code in some application specific meaningful way.

Upon receiving a new request, the core proxy, such as that embodied in onion proxy/onion router 18 at firewall 68, uses the prepended standard structure as a basis element in building an onion for the overall onion router network, such as that of FIG. 2, for defining the route of an anonymous connection to the destination. The core proxy, such as in onion proxy/onion router 18, passes the onion to the onion router in onion proxy/onion router 18, which then passes the onion to the next onion router and so forth, that is, node 20 of FIG. 2, building the anonymous connection to the responder proxy of responder proxy/onion router 24, and then passes the prepended standard structure to the responder proxy specifying the ultimate destination, such as the responder machine $12_2$ of FIG. 2. From this point on, the core proxy blindly relays data back and forth between the client proxy and the onion routing network (and thus the responder proxy, such as the responder proxy of responder proxy/onion 24 of FIG. 2, at the other end of the anonymous connection).

An initiating application, such as that running the initiator machine $12_1$, makes a socket connection, such as connection 46 of FIG. 2, to an application specific proxy on some onion router; i.e., to the proxy/onion router 18 at firewall 68. proxy of onion/onion router 18 defines a route through the onion routing network, illustrated by virtual circuit 16 of FIG. 2, in a manner as previously described. The last onion router, that is, node 24, forwards data to another type of proxy called the responder's proxy, such as the responder proxy of responder proxy/onion router 24, whose job is to pass data between the virtual circuit 16 and the responder, such as the responder machine $12_2$.

The present invention provides layering cryptographic operations and gains an advantage over prior art link encryption. More particularly, as data move through the network, such as the virtual circuit 16, the data appear different to each onion router, such as nodes 18, 20, 22, and 24. Therefore, an anonymous connection is as strong as its strongest link, and even one honest node is enough to maintain the privacy of the route. In contrast, in link encrypted systems, compromised nodes can see all information as plaintext.

Although the present invention terms this system as onion routing, the routing that occurs in the present invention does so at the application layer of the protocol stack and not at the Internet Protocol (IP) layer. More specifically, the present invention relies upon IP routing to route data passed through longstanding socket connections. An anonymous connection may be comprised of several linked longstanding socket connections. Therefore, although the series of onion routers in an anonymous connection is fixed for the lifetime of that anonymous connection, the route that data actually travels between individual onion routers is determined by the underlying IP network exchanging data in accordance with the Internet Protocol. Thus, onion routing may be compared to loose source routing, known in the art.

Onion routing of the present invention depends upon connection based services that deliver data uncorrupted and in-order that is, in a preplanned arrangement known by the receiver. This simplifies the specification of the system, such as the specification related to the packet switching network 10 of FIG. 1. Transmission Control Protocol (TCP) socket connections, which are layered on top of a connectionless service like Internet Protocol (IP), provide these uncorrupted and in-order guarantees. Similarly, onion routing of the present invention could easily be layered on top of other connection based services, such as those provided by the Asynchronous Transfer Mode (ATM) protocol AAL5.

The present invention provides a predetermined route between the initiator machine $12_1$ and the responder machine $12_2$ by sending the proper onion information to the nodes 20, 22, and 24. Messages distributed by the present invention contain a circuit identifier, a command (create, destroy, and data), and data. Any other command is considered an error, and the node, such as nodes 18 . . . 26, who receives such a message ignores that message except to return a destroy command back through that virtual circuit, such as virtual circuit 16 of FIG. 2. The create command carries an onion. Where a node, such as nodes 18 . . . 24, receives a create command along with an onion, the node, such as node 18, 20, 22, or 24, chooses a virtual circuit identifier and sends another create message containing this identifier and the onion (padded and with one layer peeled off) to the next node. The receiving node also stores the virtual circuit identifier received and virtual circuit identifier sent as a pair. Until the information relevant to the virtual circuit at a node of circuit 16 is destroyed, such as any of the nodes 18, 20, 22, and 24 of virtual circuit 16, whenever the node receives data on the one connection, the node sends it off to the adjacent node. The receiving node applies the forward cryptographic function and key (obtained from the onion) to data moving in the forward direction (along the route the onion originally traveled) or the backward cryptographic function and key to data moving in the opposite direction (along the onion's reverse route).

Data sent by the initiator machine $12_1$, over the virtual circuit 16, is "pre-crypted" repeatedly by core proxy of onion proxy/onion router 18 by applying the inverse of all the forward cryptographic operations specified in the onion, innermost first. Therefore, these layers of cryptography are peeled off as the data travels forward through the virtual circuit 16. Data sent by the responder machine $12_2$ is "crypted" once by onion router of responder proxy/onion router 24 (node 24) and again by each previous node in the virtual circuit 16 using the backward cryptographic operation specified at the corresponding layer of the onion. The initiator's proxy of onion proxy/onion router 18 applies the inverse of the backward cryptographic operations specified in the onion outermost first, to this stream, to obtain the plaintext.

In the present invention, it is not necessary that the entire route be predefined by the initiator's proxy, that is, by the proxy of onion proxy/onion router 18. The proxy of onion proxy/onion router 18 can instruct various nodes along the route to choose their own route to the next prespecified node, such as nodes 20, 22, and 24. This technique can be useful for securing purposes by adding more hops to the chain or transmission path from the initiator machine $12_1$ to the responder machine $12_2$. This technique could also be used if the initiating proxy, such as the proxy of onion proxy/onion router 18, does not know a complete, connected route to the responder machine $12_2$, but believes that the node where any break in the transmission path occurs can construct a route to the next node. Also, since onions being handled by any of the router nodes, such as nodes 18, 20, 22, 24 and 26 of FIG. 2, are all of fixed size, there is a fixed maximum length, to the route from the initiator's proxy, such as the proxy of onion proxy/onion router 18, to the responder's proxy, that is, the proxy of responder proxy/onion router 24. Loose routing allows the present invention to increase the size of that maximum for the same fixed onion size. It is also possible to iterate the loose routing process, allowing nodes on the added route from the initiator machine $12_1$ to the responder machine $12_2$, to add additional nodes to the chain.

In the practice of the present invention, more particularly, in the firewall 68 setting of FIG. 2, a system administrator of the sensitive site that includes the initiator machine $12_1$ may set up a proxy server, such as the proxy of onion proxy/onion router 18, on the firewall machine, which will be responsible for forwarding requests from the protected domain (within the secured site defined by the firewall 68) out onto the open Internet, and maintaining a return path for the response to the request. A proxy server, such as the proxy of onion proxy/onion router 18, can be divided into two parts: the front end that receives and parses the request, and the back end that processes the request and returns the results back to the requester. Classically, the front and back ends are the same process running on one machine.

In the present invention, a couple of assumptions are assumed which are: 1) proxy/routing nodes and intermediate routing nodes, all comprised of a typical configuration, such as that illustrated for the virtual circuit 16 of FIG. 2, have knowledge about each other in advance of their operation, and 2) public key certificates (known in the art) for each node have been securely distributed to all other nodes prior to operation.

All nodes, such as the nodes of FIG. 2, are connected by link encrypted connections, such as those of FIG. 2, which multiplex many virtual circuits, that is, more than one virtual circuit 16 of FIG. 2, between initiator and responder proxy nodes, that is, nodes 18 and 24 respectively. For the embodiment of FIG. 2, the initiator proxy corresponds to onion proxy/onion router 18 and the responder proxy corresponds to the responder proxy/onion router 24. All messages moving through these connections are of fixed size and have two components, header and payload fields, such as normally occurring in a packet switching system 10. Header fields contain the virtual circuit identifier and the commands (previously discussed) and are link encrypted information using a stream cipher, known in the art. The payload is encrypted via the same link encryption.

In the present invention, there are three commands that the nodes of FIG. 2 should understand and respond to accordingly. The first is to create a virtual circuit. More particularly, at each node, a virtual circuit has two connections. Data arriving on one connection is passed along on the other connection. The virtual circuit is defined by the labels for these two connections. Creating a virtual circuit, such as the virtual circuit 16 of FIG. 2, is the process of defining these labels for each node along the route. For the first proxy/routing node, such as onion proxy/onion router 18 of FIG. 2, one connection is a link to the initiator machine $12_1$, and the other is a link to the next routing node, such as node 20. The proxy/routing node 18 creates an onion defining the sequence of intermediate routing nodes to the responder's proxy/routing node, that is, the responder proxy/onion router 24 of FIG. 2. The proxy of onion proxy/onion router node 18 breaks the onion up into payload sized chunks and transmits these chunks in an order and predetermined sequence to the next node with a control field containing both the label (made-up name) of the connection and a create command. Each subsequent node reassembles the onion and peels off (decodes) a layer from the onion which reveals the next node in the predetermined route and two cryptographic function/key pairs. Before acting on the create command, the receiving node checks whether the onion has expired or is a replay. To check for replay, the node consults a table, embedded therein, of unexpired onions that it has previously seen. If the onion is valid, the onion is inserted into the table of the node, and the node then labels a new connection to the next node and passes the peeled and padded onion in a similar sequence of messages to the next node. The receiving node also updates a table containing the labels aid cryptographic function/key pairs associated with the new virtual circuit. The appropriate (forward or backward) function/key pair should be used to crypt data moving along that circuit, such as along the virtual circuit 16 of FIG. 2. The responder's proxy/routing node 24, recognizing that the onion is empty, partially updates its tables. As with standard proxies, the next data message along this virtual circuit 16 identifies the responder $12_2$.

The second command that needs to be understood by the nodes of FIG. 2 is data. More particularly, the second role of the initiator's proxy/routing node, that is, the onion proxy/onion router 18, is to pass a stream of data from the initiator machine $12_1$ along the virtual circuit 16 together with other control information, for the responder's proxy/routing node, that is, the responder proxy/onion router 24 of FIG. 2. To do this, the proxy of onion proxy/onion router 18 breaks the incoming stream into (at most) payload sized chunks, and repeatedly pre-crypts each chunk using the inverse of the cryptographic operations specified in the onion, innermost first. The function/key pairs that are applied, and the virtual circuit 16 identifier of the connection to the next node, are obtained from a table in the associated node of the virtual circuit 16. The header field for each payload is the label of the connection and a data command. Each subsequent node looks at its table, obtaining the cryptographic function/key pair associated with the virtual circuit 16 (for the appropriate direction) and the virtual circuit 16 identifier of the connection to the next node. Each subsequent node then peels off (decodes) a layer of cryptography and forwards the peeled payload to the next node. Once the data reaches the onion router of responder proxy/onion router 24, its final cryption produces the plaintext that is to be processed or forwarded to the responder machine $12_2$.

The data command can also be used to move data from the responder's proxy/routing node 24 to the initiator's proxy/routing node 18. The responder's proxy/routing node 24 obtains the cryptographic function/key pair and the virtual circuit identifier for the next node from its tables, and crypts the stream. The node 24 breaks the crypted stream into payload sized chunks and forwards them to the next node with the appropriate control field. Each subsequent node further stream crypts each payload using the appropriate function/key associated with that virtual circuit 16. Once a message arrives at the initiator's proxy/routing node 18, the core proxy of onion proxy/onion router 18 looks at its table and applies the inverse of the backward cryptographic operations specified in the onion, outermost first, to this stream to obtain the plaintext. The plaintext is then forwarded to the initiator machine $12_1$.

The third command that needs to be recognized and responded to by all nodes 18, 20, 22, and 24 of the virtual circuit 16 of FIG. 2 is the destroy message which is used to tear down a virtual circuit, such as virtual circuit 16, when the virtual circuit 16 is no longer needed or to perform such tear down in response to certain error conditions. It should be noted that destroy messages can be initiated by any node along a virtual circuit 16, and it is a node's obligation to forward the destroy messages in the appropriate directions. (A node initiating a destroy message in an active virtual circuit, such as virtual circuit 16 of FIG. 2, forwards it in both directions. A node that receives a destroy message passes it along in the same direction that it was received.) The payload of a destroy command is empty padding. Nonetheless, this payload is still crypted with the appropriate function/key pair. In addition to the destroy command, the control field contains the virtual circuit identifier, such as those of the virtual circuit 16, of the recipient of the destroy command. Upon receipt of a destroy command, a node, such as nodes 18, 20, 22, and 24, of FIG. 2, deletes the table entries (previously discussed) associated with the virtual circuit 16.

It should now be appreciated that the present invention provides an electronic communication path between an initiator and a responder on a packet switching network comprising an onion routing network that safeguards against traffic analysis and eavesdropping by other users of the packet switching network.

It is understood that the invention is not limited to the specific embodiments herein illustrated and described, but may be used otherwise without departing from the spirit and scope of the invention.

What we claim is:

1. A virtual circuit that is a pathway between two devices, one defined as an initiator and the other defined as a responder and both communicating with each other in a network, said circuit comprising:

a plurality of onion routers arranged adjacent to each other to define said pathway and where adjacent onion routers maintain longstanding connections to each other and where each of said onion routers is responsive to an onion having a layered data structure with one layer per each of the onion routers in said pathway, each layer of said onion comprising a public-key encryption of the identity of the next onion router in said pathway;

said initiator having means for making a request to a first proxy having means to establish said pathway between said two devices; whereby said pathway comprises an anonymous connection between said two devices such that identities of at least one of said two devices are concealed.

2. The virtual circuit according to claim 1, wherein said first proxy connects to a second proxy which, in turn, establishes said pathway between said two devices.

3. The virtual circuit according to claim 2, wherein said second proxy includes means to create said onion and wherein said second proxy uses said onion to establish said pathway.

4. The virtual circuit according to claim 1, wherein said first proxy defines said pathway comprising paths between adjacent onion routers.

5. The virtual circuit according to claim 1, wherein said network is a packet switching network and wherein all packets are packaged into fixed length cells.

6. The virtual circuit according to claim 5, wherein said onion routers forward all cells received in a prespecified time interval in an order that is random with respect to the virtual circuit on which they were received.

7. The virtual circuit according to claim 1, wherein said first proxy includes means to create said onion and wherein said first proxy uses said onion to establish said pathway.

8. The virtual circuit according to claim 1, wherein each onion router includes means to cryptographically transform said onion and send said transformed onion to said next onion router.

9. The virtual circuit according to claim 8, wherein said means to cryptographically transform said onion includes means to decrypt said one layer of said onion corresponding to said onion router.

10. The virtual circuit according to claim 1, wherein each onion router includes means to cryptographically transform data passing on said virtual circuit between said initiator and said responder.

11. The virtual circuit of claim 10, wherein said each layer of said onion comprises an encryption of cryptographic keys and the identity of the next onion router in said pathway, and wherein said means to cryptographically transform data includes means for using said cryptographic keys to cryptographically transform data.

12. A method for establishing and utilizing a virtual circuit in a packet switching network to provide a pathway between two devices, one defined as an initiator and the other defined as a responder, said method comprising the steps of:

providing a plurality of onion routers arranged adjacent to each other to define said pathway and where adjacent onion routers maintain longstanding connections to each other and each having a protocol to provide communications therebetween, each of the onion routers being responsive to an onion, having a layered data structure with one layer per each of the onion routers in said pathway, each layer of said onion comprises a public key encryption of the identity of the next onion router in the pathway;

providing a first proxy responsive to said initiator and having means for establishing said pathway;

said initiator requesting said first proxy to establish said pathway; whereby said pathway comprises an anonymous connection between said two devices such that identities of at least one of said two devices are concealed.

13. The method according to claim 12, wherein said first proxy requests a second proxy to establish said pathway.

14. The method according to claim 13, wherein said second proxy creates said onion and wherein said second proxy uses said onion to establish said pathway.

15. The method according to claim 12, wherein said first proxy defines said pathway as comprising paths between adjacent onion routers.

16. The method according to claim 12, wherein said network is a packet switching network and wherein all packets are packaged into fixed length cells.

17. The method according to claim 16, wherein said onion routers forward all cells received in a prespecified time interval in an order that is random with respect to the virtual circuit on which they were received.

18. The method according to claim 12, wherein said first proxy creates said onion and wherein said first proxy uses said onion to establish said pathway.

19. The method according to claim 12, wherein each onion router cryptographically transforms said onion and sends said transformed onion to said next onion router.

20. The method according to claim 19, wherein said cryptographic transformation of said onion includes decryption of said one layer of said onion corresponding to said onion router.

21. The method according to claim 12, wherein each onion router cryptographically transforms data passing on said virtual circuit between said initiator and said responder.

22. The method according to claim 21, wherein said each layer of said onion comprises an encryption of cryptographic keys and the identity of the next onion router in said pathway, and wherein said cryptographic keys are used to cryptographically transform data.

* * * * *